3,021,307
**POLYURETHANE ELASTOMERS CURED
WITH PARAFORMALDEHYDE**
Ernest Csendes, Christiana Hundred, Del., assignor to
E. I. du Pont de Nemours and Company, Wilmington,
Del., a corporation of Delaware
No Drawing. Filed June 30, 1958, Ser. No. 745,282
2 Claims. (Cl. 260—72)

This invention relates to novel polyurethane elastomers and more particularly to polyether polyurethane elastomers which have been cured by means of paraformaldehyde.

Heretofore formaldehyde and derivatives thereof have been used as curing agents for polyurethane polymers, more particularly polyurethane polymers prepared from a linear polyester or polyester amide and a diisocyanate. In order to promote this type of a cure it has been necessary to use rather strong acid catalysts such as hydrochloric acid, however these catalysts are impracticable since they are often difficult to handle and, because they are strong acids, they tend to cause degradation of any polyurethane polymers with which they are used. In addition, the activities of these catalysts are such that when they are incorporated with the polyurethane polymer and the curing agent in the usual manner on a rubber mill, the heat produced by the action of the milling causes premature curing or scorching of the mix. It has been suggested to overcome this latter detrimental feature by using curing catalysts which are substantially neutral and remain so at temperatures obtained during milling but which develop acidity at temperatures used in the curing operation. Here again, however, it has been found that there is some tendency for scorching of the mix during the milling or other precuring operation.

It is an object of the present invention to provide a novel process for curing polyether polyurethane polymers with paraformaldehyde. A further object is to provide a process for curing such polymers with paraformaldehyde in the presence of a neutral catalyst which is easy to handle and which does not generate acid under conditions used in the milling or curing operation. A still further object is to provide a novel polyether polyurethane elastomer which has been cured by using paraformaldehyde, which elastomer has excellent physical properties. Further objects will appear hereinafter.

These and other objects of this invention are accomplished by providing a cured polyether polyurethane elastomer which is obtained by heating a polyether polyurethane polymer with from about 3.0 to 10.0% by weight of paraformaldehyde in the presence of from about 0.2 to 1.0% by weight of a neutral catalyst. The heating should be carried out at a temperature of from about 120 to 160° C. for a time of from about 20 minutes to 3 hours. The cured elastomer which results from the process of the present invention has many highly desired uses as will be more particularly discussed hereinafter.

The polyether polyurethane polymers which may be cured according to the process of the present invention may be prepared from polyether glycols and aromatic diisocyanates. The polyether glycols may be any of a wide variety of glycols including polyalkyleneether glycols, polyethylene-aryleneether glycols or polyalkyleneether-thioether glycols. These glycols should have a molecular weight between about 750 and 5,000.

The polyalkyleneether glycols are compounds which may be represented by the general formula $HO(GO)_nH$ wherein G is an alkylene radical which need not necessarily be the same in any particular glycol and $n$ is an integer so that the average molecular weight of the polyalkyleneether glycol is at least about 750. These polyalkyleneether glycols may be prepared by well known methods. Representative polyalkyleneether glycols include polyethyleneether glycols, polypropyleneether glycols, polytrimethyleneether glycols, polytetramethyleneether glycols, polyetherpropyleneether glycols, etc.

The polyalkyleneether-thioether glycols may be represented by the general formula set forth above for the polyalkyleneether glycols wherein part of the ether oxygens are replaced by sulfur atoms. These glycols may be prepared by well known methods such as the catalytic dehydration of thiodiglycol and diethylene glycol.

The polyalkylene-aryleneether glycols are similar to the polyalkyleneether glycols except that some of the alkylene radicals are replaced by arylene radicals and in addition, if desired, part of the ether-oxygens may be replaced with sulfur. In general the phenylene and naphthalene radicals are preferred with or without substituents such as alkyl groups. The preparation of these glycols is described in U.S. Patent 2,843,568.

Any of a wide variety of aromatic diisocyanates may be used for reaction with the polyether glycol in preparing the polyether polyurethane polymers. Representative compounds include 2,4-tolylenediisocyanate, m-phenylenediisocyanate, 4-chloro-1,3-phenylenediisocyanate, 4,4'-diphenylenediisocyanate and 1,5-naphthalenediisocyanate. 2,4-tolylenediisocyanate is the preferred diisocyanate. In general any aromatic diisocyanate may be used which has no substituents reactive with the glycol, other than the two isocyanate groups. Thus these diisocyanates may contain a wide variety of inert substituents such as hydrocarbon radicals, halogen radicals, nitro groups, alkoxy groups, etc.

In preparing the curable polyether polyurethane polymers various procedures may be employed. In one of these the polyether glycol is reacted with the aromatic diisocyanate in approximately stoichiometrically equivalent proportions in which case a plurality of urethane linkages will be formed and there will be substantially no free isocyanate groups in the final polymers. The resulting product will either be a solid or a liquid polymer. The liquid polyether polyurethanes result from the use of relatively low molecular weight polyether glycols, i.e. glycols having a molecular weight of about 750. The reaction of the glycol with the diisocyanate may be carried out in suitable mixing equipment at temperatures of from about 20° C. to about 150° C.

If desired the curable polymer may be prepared by reacting the polyether glycol with a molar excess of the aromatic diisocyanate, as described above, in which case an isocyanate-terminated intermediate polymer will be formed. This intermediate polymer may then be reacted with a monofunctional compound such as alkanol in order to cap the free isocyanate groups, or, if desired, it may be reacted with a chain extending agent which is an organic compound containing a plurality of active hydrogen atoms capable of reacting with isocyanates, there being no more than two atoms in the chain extending agent having active hydrogen attached thereto. Representative chain extending agents include compounds such as ethylene gylcol, 2-allyloxymethyl-2-methyl-1,3-propanediol, hexamethylene glycol, diehylene glycol, etc.

As mentioned above, the curable polyether polyurethane polymers are cured according to the process of the present invention by employing paraformaldehyde in the presence of a neutral catalyst. Paraformaldehyde is a linear polymer of formaldehyde obtained by evaporation of formaldehyde solutions wherein the number of formaldehyde units that have combined to form the linear polymer varies between about 6 and 100.

The amount of paraformaldehyde to be used should range from about 3.0 to 10.0% by weight of the uncured polyurethane polymers. The 10.0% figure represents a practical upper limit whereas amounts less than about 3.0% do not give a satisfactory cure. If desired, the present invention may be carried out using formaldehyde as a curing agent in which case it is employed in gaseous form.

The catalyst used in carrying out the curing process of this invention is a neutral catalyst and does not generate acid under the conditions of curing. This catalyst is a zinc halide quinoline complex and may be represented by the formula $ZnX_2:2(C_9H_7N)$ wherein X is a halogen radical. It may be prepared by adding quinoline to a well agitated solution of the zinc halide at room temperature. The complex precipitates from solution and is filtered off as a filter cake, is then washed with a small amount of ethanol and dried under vacuum. In carrying out the process of this invention from about 0.2 to 1.0% by weight based on the weight of the uncured polyurethane polymer of the zinc halide quinoline complex should be employed.

In carrying out the curing process of this invention the uncured polyether polyurethane polymer is placed on a rubber mill and mixed with the paraformaldehyde and neutral catalyst complex. During the mixing procedure other compound ingredients can be used such as carbon black, silica, various plasticizers, dyes, etc. After milling the compounded polymer is then subjected to heating at a temperature from about 120 to 160° C. in order for the curing reaction to take place. Normally the curing reaction is carried out in a pressure mold for a curing time of from about 20 minutes to about 3 hours.

The mechanism of the curing reaction involves the reaction of the paraformaldehyde with the hydrogen atom on the urethane nitrogen linkages. The paraformaldehyde splits to generate formaldehyde and two such urethane nitrogen atoms are linked together by a methylene bridge. The cured elastomers obtained could, therefore, be represented as containing a plurality of cross-linked units of the following structure:

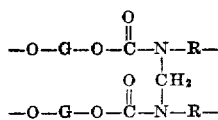

wherein —O—G—O— is the bivalent radical obtained by removing the terminal hydrogen atoms from the polyether glycol and R is the bivalent aromatic diisocyanate residue.

The cured elastomers which are obtained by the present invention are generally pale yellow or amber in color and have particularly good thermal and hydrolytic stability. These elastomers have many varied uses in common with other polyurethane elastomers. Among the many articles and uses to which the cured elastomers of this invention are applicable may be mentioned the following: pneumatic tires, of which either the carcass, the tread or side wall or any combination may be of these materials; also the chafing strip, the rubbing strip on the outside of the tire, friction stock for cord in the tire carcass, and the inner liners of tubeless tires; the elastomer may be reinforced with glass fiber and metal wire as well as cotton, rayon, nylon, etc., solid tires, either cast or molded as complete tires or as the tread over another elastomer; inner tubes, either plain or puncture-proof and alone or in combination with other elastomers; belts for power transmission, for conveying materials for timing, either flat, round, or V-shaped and made completely of the polymeric products of this invention or laminated with fabric or other elastomers or wire such as cotton, glass fiber, asbestos, nylon, rayon, polyester fiber polyacrylonitrile, metal wire, the top or wearing surface usually being of these new products due to their excellent abrasion resistance (oxides of metals such as antimony or zinc may be added during compounding to increase fire resistance); hose for liquids, slurries, solids (abrasive), dusts, gases, solvents, corrosive materials, fume ducts, all of which may be reinforced in the same way as the belts described above, tubing, which is unsupported hose, and may be formed completely of these products or laminated with other polymers and elastomers; mechanical goods, molded, extruded, lathe cut, stamped out, cast, or dipped, such as grommets, sealing rings, channel rubbers, packing gaskets, mountings, bellows, matting (floor covering), tile, rolls, oil-well swabs, pipe-wipers, slush pump pistons, packers, tractor cleats, tank tread blocks, drug sundries, etc.; wire and cable jackets resistant to abrasion, weather, and ozone, which may be entirely composed of the polymer products of this invention or which have this as an outer layer on top of another insulator, in either of which reinforcing fabric or metal may be incorporated; footwear, soles, heels, uppers either from the polymers of this invention or from these materials compounded or laminated with a variety of other materials such as cork, fabric, leather, elastomers, plastic polymers, etc.; coated fabrics of cotton, glass fibers, rayon, wool, polyacrylonitrile, polyester fibers, leather, paper, plastics, or laminates of these with other elastomers, prepared by dipping, spreading or calendering; films in the form of gloves, balloons, diaphragms, sheeting, wrapping film, etc.; coating or paint compositions for wood, metal, plastic, concrete, brick, ceramics, leather, etc.; adhesives, in the form of uncured sheets or solvent solutions or suspensions for bonding various materials to each other, such as metals, wood, plastic, ceramics, leather, fabrics, elastomers, in the formation of any of the herein-mentioned products containing a combination of elements; cellular products which may be self-blown (i.e. by reaction of excess —NCO with water) or expanded with a blowing agent, for use as sealing strips, cushions, gaskets, matting, shoe soles, vibration dampeners, shock absorbers, packaging material or buoyant articles; electrically conductive elastomeric articles when compounded with conductive materials such as certain carbon blacks and powdered metals.

The basic elastomeric properties of the elastomers may be varied by suitable compounding. The amount and type of compounding agent incorporated in the stock is dependent upon the use for which the elastomer is intended. Included among such of the more important useful compounding agents are carbon black, clay, silica, talc, and plasticizers. Inorganic and organic coloring agents may be incorporated to give well defined colors since the natural color of the elastomer is a pale yellow or light amber.

The following examples will better illustrate the nature of the present invention; however, the invention is not intended to be limited to these examples. Parts are by weight unless otherwise indicated.

The following methods were used to carry out the tests given in the examples.

Compression set: ASTM Method D395–53T (Method B, 22 hours, 70° C.)

Heat build-up: ASTM Method D623–52T (Method A)

Thermal stability: Tentative ASTM Method D865–52T

The stress-strain properties were determined by the Williams ring tester.

EXAMPLE 1

A polymer was prepared by reacting with agitation and under nitrogen 0.2 mole of polytetramethyleneether glycol of 1040 molecur weight with 0.2 mole of 2,4-tolylenediisocyanate in the presence of 0.18% by weight of ferric acetyl acetonate at 130° C. for 60 minutes. The resulting polyurethane polymer showed no free isocyanate groups by analysis.

Samples of this polymer were compounded on a rubber mill and cured as indicated in Tables I and II.

TABLE I

|  | Parts by weight | | |
| --- | --- | --- | --- |
|  | A | B | C |
| Polymer | 100 | 100 | 100 |
| High abrasion furnace black | 30 | 30 |  |
| Easy processing channel black |  |  | 30 |
| Paraformaldehyde | 5 | 5 | 5 |
| ZnCl$_2$·2 (quinoline) | 0.35 | 1 | 0.7 |
| Dioctyl phthalate |  | 15 |  |

TABLE II

| Cure time and temperature | 20'/150° C. | | | 80'/150° C. | | |
| --- | --- | --- | --- | --- | --- | --- |
|  | A | B | C | A | B | C |
| M$_{300}$, 25° C. (p.s.i.) | 1,100 | 750 | 1,350 |  |  |  |
| T$_B$, 25° C. (p.s.i.) | 4,000 | 3,100 | 3,400 | 2,150 | 1,700 | 1,800 |
| E$_B$, 25° C. (percent) | 580 | 610 | 480 | 230 | 230 | 210 |
| T$_B$, 25° C. (p.s.i.) | 1,800 | 800 | 600 | 500 | 500 | 500 |
| Yerzley resilience at — |  |  |  |  |  |  |
| 25° C | 65 | 66 | 73 | 80 | 81 | 85 |
| 100° C |  | 78 |  |  | 87 |  |
| Compression set, 70° C |  | 20 | 17 | 6 | 7 | 5 |
| Shore A hardness | 65 | 59 | 66 | 70 | 64 | 71 |
| Heat build-up, Δc (3/16", mils)$^1$ | 103 | 16 | 0 | 0 | 0 | 0 |
| Final center temp. (FCT) (° C.) | 196 | 153 | 188 | 145 | 131 | 135 |

$^1$ Δc=Change in compression=final compression—minimum compression, 3/16" stroke employed.

EXAMPLE 2

A. One mole of polypropyleneether glycol of molecular weight 2025 and 1 mole of 2-allyloxymethyl-2-methyl-1,3-propanediol were mixed thoroughly. Then, two moles of 2,4-tolylenediisocyanate were added and the mass reacted at 130° C. for 1 hour. The specific viscosity at 30° C. of a 1% solution of the polymer in a 50:50 mixture of dimethylformamide and tetrahydrofuran was 1.18.

B. Following the procedure of A above, a polymer was prepared from 2 moles of polypropyleneether glycol of molecular weight 1025, 1 mole of 2-allyloxymethyl-2-methyl-1,3-propanediol and 3 moles of 2,4-tolylenediisocyanate. The specific viscosity of the polymer, determined as in A above, was 1.03.

C. A mixture was prepared from 233 g. of 2-allyloxymethyl-2-methyl-1,3-propanediol and 2905 g. of a polyethylene-propyleneether glycol having a molecular weight of 2015.

Then 530 g. of this mixture, 2.32 g. of trimethylolpropane and 91.65 g. of 2,4-tolylenediisocyanate were reacted at 130° C. for one hour in the presence of approximately 0.2% by weight of ferric acetylacetonate. The polyurethane polymer obtained had an intrinsic viscosity of 1.62, determined as in A above.

D. Polymers A, B and C were compounded as in Table III. Table IV gives the physical properties of the cured stocks.

Table III

|  | Polymer | | |
| --- | --- | --- | --- |
|  | A | B | C |
| Polymer | 100 | 100 | 100 |
| High abrasion furnace black | 30 | 30 | 30 |
| Paraformaldehyde | 4 | 4 | 5 |
| ZnCl$_2$·2 (Quinoline) | 1 | 1 | 0.7 |

Table IV

|  | 80'/150° C. | | |
| --- | --- | --- | --- |
|  | A | B | C |
| M$_{300}$, 25° C. (p.s.i.) | 1,500 |  |  |
| T$_B$, 25° C. (p.s.i.) | 1,800 | 1,600 | 1,000 |
| E$_B$, 25° C. (Percent) | 330 | 290 | 150 |
| T$_B$, 70° C. (p.s.i.) | 600 | 500 | 400 |
| Yerzley resilience, 25° C | 67 | 50 | 75 |
| Compression set, 70° C | 6 | 9 | 3 |
| Shore hardness | 53 | 55 | 59 |
| Heat build-up: |  |  |  |
| Δc(3/16", mils) | 0 | 2 | 0 |
| FCT (° C.) | 155 | 170 | 124 |

EXAMPLE 3

A polyether polyurethane polymer is prepared by adding 3 moles of 2,4-tolylenediisocyanate to one mole of 3-(allyloxy)-1,2-propanediol and the mixture thus obtained is agitated for 3 hours at 80° C. under an atmosphere of nitrogen. Then 2 moles of polytetramethylene-ether glycol of molecular weight 1000 is added and the mass is agitated at 80° C. for one hour. Finally, it is transferred to a polyethylene-lined container and heated in an oven at 80° for 72 hours. A rubbery polymer is obtained.

This polymer is compounded on a rubber roll mill. A number of formulations are compounded each one containing 100 parts of the polymer, 30 parts of high abrasion furnace black, and varying amounts of paraformaldehyde and the complex of zinc chloride and quinoline. The following table illustrates these formulations:

Table V

|  | A | B | C | D | E | F |
| --- | --- | --- | --- | --- | --- | --- |
| Polymer | 100 | 100 | 100 | 100 | 100 | 100 |
| High abrasion furnace black | 30 | 30 | 30 | 30 | 30 | 30 |
| Paraformaldehyde | 3 | 0.35 | 5 | 5 | 5 | 5 |
| ZnCl$_2$·(quinoline)$_2$ | 0.5 | 0.35 | 0.7 | 1.0 | 1.0 | 1.0 |
| Plasticizer |  |  |  |  |  | 15 |

To cure each of these compounded stocks a portion of each was taken and cured in a press for 80 minutes. Formulations A, C and F were cured at 150° C. and B, D and E at 140° C.

Table VI illustrates the physical properties of the cured elastomers.

Table VI

|  | A | B | C | D | E | F |
| --- | --- | --- | --- | --- | --- | --- |
| M$_{300}$ (p.s.i.) at 25° C | 1,400 | 1,800 |  | 3,000 |  | 2,600 |
| T$_B$ (p.s.i.) at 25° C | 3,400 | 3,700 | 2,850 | 3,500 | 1,500 | 2,600 |
| E$_B$ (percent) at 25° C | 510 | 460 | 290 | 335 | 140 | 300 |
| Yerzley resilience at— |  |  |  |  |  |  |
| 25° C | 48 | 58 | 70 | 68 | 80 | 67 |
| 100° C |  | 75 |  | 82 | 89 |  |
| Compression set (1% at 70° C and 22 hours) | 28 | 22 | 7 | 9 | 4 | 7 |
| Shore A hardness | 63 | 65 | 70 | 70 | 76 | 65 |
| Heat build-up: |  |  |  |  |  |  |
| Δc (3/16", mils) | 204 | 35 | 0 | 2 | 0 | 0 |
| FCT, (° C.) | 161 | 192 | 147 | 163 | 114 | 156 |

It is obvious from the physical properties in Table VI that the cured elastomers obtained have excellent compression set and have good dynamic characteristics as measured by the heat build-up test.

EXAMPLE 4

Two portions of the polymer prepared in Example 3 where compounded with paraformaldehyde according to Table VII and cured at 150° C. for 20 minutes and 80 minutes respectively. Table VII indicates the physical properties of the cured elastomers.

Table VII

|  | Parts by weight ||
|---|---|---|
|  | A | B |
| Polymer | 100 | 100 |
| High abrasion furnace black | 30 | 30 |
| Paraformaldehyde | 5 | 3 |
| ZnCl₂·(quinoline)₂ | 0.35 | 0.5 |

Table VIII

| Curing time/temp | 20'/105° C. || 80'/150° C. ||
|---|---|---|---|---|
|  | A | B | A | B |
| $M_{300}$, 25° C | 2,100 | 1,600 |  |  |
| $T_B$, 25° C | 3,000 | 4,000 | 1,100 | 3,000 |
| $E_B$, 25° C | 370 | 490 | 120 | 290 |
| $T_B$, 70° C | 600 | 1,600 | 500 | 700 |
| Yerzley resilience at— |  |  |  |  |
| 25° C | 60 | 58 | 83 | 65 |
| 100° C | 76 | 65 | 90 | 83 |
| Compression set, 22 hrs. 70° C | 19 | 28 | 3 | 8 |
| Shore A hardness | 61 | 64 | 73 | 66 |
| Heat build-up: |  |  |  |  |
| Δc (mils, 3/16") | 108 | 180 | 0 | 3 |
| FCT (° C.) | 171 | 162 | 136 | 184 |

EXAMPLE 5

To measure the hydrolytic stability of the cured elastomers a sample was refluxed in water over a period of several days and samples withdrawn periodically to determine stress strain characteristics. Table IX indicates the data obtained.

Table IX

| Polymer formulations | Curing cycle | Reflux time (days) |||
|---|---|---|---|---|
|  |  | 0 | 4 | 7 |
| Ex. 3-F | 80'/150° C., $M_{300}$ at 25° C | 2,550 | 2,250 | 2,400 |
|  | 80'/150° C., $T_B$ at 25° C | 2,550 | 2,500 | 3,200 |
|  | 80'/150° C., $E_B$ at 25° C | 300 | 315 | 335 |
| Ex. 1-A | 80'/140° C., $M_{300}$ at 25° C | 1,400 | 1,500 | 1,900 |
|  | 80'/140° C., $T_B$ at 25° C | 3,800 | 3,700 | 4,000 |
|  | 80'/140° C., $E_B$ at 25° C | 510 | 490 | 475 |

EXAMPLE 6

Thermal stability of the cured elastomers was evaluated by aging rings in air at 120° C. for several days. Table X illustrates the physical properties of a representative aged cured elastomer.

Table X

| Polymer formulation | Curing cycle | Days of aging at 120° C. |||||
|---|---|---|---|---|---|---|
|  |  | 0 | 3 | 7 | 10 | 12 |
| Ex. 3-B | 80'/150° C., $M_{300}$ at 25° C | 1,600 | 1,850 | 1,800 | 1,800 |  |
|  | 80'/150° C., $T_B$ at 25° C | 2,950 | 2,700 | 2,500 | 2,100 | 1,900 |
|  | 80'/150° C., $E_B$ at 25° C | 300 | 250 | 230 | 220 | 190 |

EXAMPLE 7

A sample of the polymer of Example 1 was compounded as follows:

Table XI

|  | Parts by weight ||
|---|---|---|
|  | A | B |
| Polymer | 100 | 100 |
| High abrasive furnace black | 30 | 30 |
| ZnCl₂·2 quinoline | 0.31 | 0.5 |
| Paraformaldehyde | 5 | 3 |

The above formulated polymers were cured at 150° C. for 80 minutes. Evaluation of cured elastomers follows:

Table XII

|  | A | B |
|---|---|---|
| $M_{300}$, 25° C | 1,500 | 1,400 |
| $T_B$, 25° C | 4,400 | 4,800 |
| $E_B$, 25° C | 500 | 560 |
| $M_{300}$, 70° C | 1,150 | 1,000 |
| $T_B$, 70° C | 2,100 | 2,500 |
| $E_B$, 70° C | 450 | 500 |
| Yerzley resilience, 25° C | 78 | 71 |
| Compression set, method B; 22 hrs. at 70° C | 6 | 11 |
| Shore A hardness | 65 | 63 |

It is apparent that many widely different embodiments of this invention may be made without departing from the spirit and scope thereof and, therefore, it is not intended to be limited except as indicated in the appended claims.

What is claimed is:

1. A process for preparing a cured elastomer which comprises heating to a temperature of from about 120 to 160° C. a polyether polyurethane polymer with from about 3.0 to 10.0 percent by weight of said polymer of paraformaldehyde in the presence of from about 0.2 to 1.0 percent by weight of said polymer of a zinc halide quinoline complex, said polyurethane polymer being substantially free of uncombined isocyanate radicals and consisting essentially of a plurality of units having the following structure

wherein —O—G—O— is a bivalent radical obtained by removing the terminal hydrogen atoms from a polyether glycol having a molecular weight of at least 750 and being selected from the group consisting of polyalkyleneether glycols, polyalkylene-aryleneether glycols and polyalkyleneether-thioether glycols and R is a bivalent aromatic radical which is inert to isocyanate groups.

2. A process according to claim 1 wherein the polyether polyurethane polymer is prepared from a polytetramethyleneether glycol having a molecular weight of at least 750 and 2,4-toluene diisocyanate.

References Cited in the file of this patent

UNITED STATES PATENTS

| 2,424,885 | Bruist et al. | July 29, 1947 |
| 2,785,150 | Kreider et al. | Mar. 12, 1957 |
| 2,814,606 | Stilmar | Nov. 26, 1957 |

FOREIGN PATENTS

| 895,700 | France | Apr. 11, 1944 |

UNITED STATES PATENT OFFICE

CERTIFICATE OF CORRECTION

Patent No. 3,021,307                      February 13, 1962

Ernest Csendes

It is hereby certified that error appears in the above numbered patent requiring correction and that the said Letters Patent should read as corrected below.

Column 7, Table VIII, heading to the second major column thereof, for "20'/105° C." read -- 20'/150° C. --; column 8, list of references cited, under "UNITED STATES PATENTS", insert the following:

2,921,926    Kehr ----- Jan. 19, 1960

Signed and sealed this 10th day of July 1962.

(SEAL)
Attest:

ERNEST W. SWIDER                      DAVID L. LADD
Attesting Officer                      Commissioner of Patents